Figure 5:
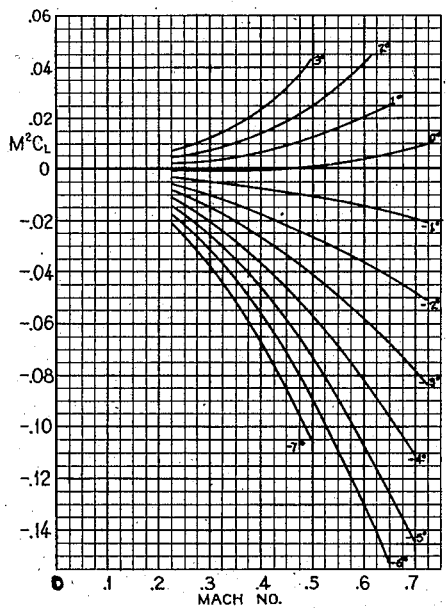

Oct. 2, 1945. G. S. SCHAIRER 2,385,845
AIRCRAFT WITH HIGH SPEED STABILITY
Filed March 15, 1943

Inventor
GEORGE S. SCHAIRER
By Reynolds & Beach
Attorneys

Patented Oct. 2, 1945

2,385,845

UNITED STATES PATENT OFFICE 2,385,845

AIRCRAFT WITH HIGH-SPEED STABILITY

George S. Schairer, Seattle, Wash., assignor to Boeing Aircraft Company, Seattle, Wash., a corporation of Washington Application March 15, 1943, Serial No. 479,162

10 Claims. (Cl. 244—13)

My invention relates to aircraft for operation at high speeds, and concerns particularly improving the longitudinal stability characteristics of an airplane at velocities approaching that of sound.

Some airplanes which have satisfactory longitudinal stability characteristics at speeds well below that of sound have become uncontrollable approaching such latter speed, and neither the cause of this undesirable characteristic nor a remedy for overcoming it has been known. It has appeared, therefore, that the practical speed of airplanes might be limited to a range below that at which such instability phenomena appeared.

It is my object to devise an airplane which will be stable at speeds in the vicinity of the velocity of sound, and particularly it is my object to construct an airplane having substantially as good longitudinal stability characteristics at speeds approaching that of sound as at lower speeds.

To comprehend the nature of my invention it is necessary to understand the effect of speed upon flight characteristics of an airplane, and consequently in the drawing I have included graphs representing the characteristics of wings and horizontal tail surfaces of typical profiles as the velocity changes.

Figure 2:
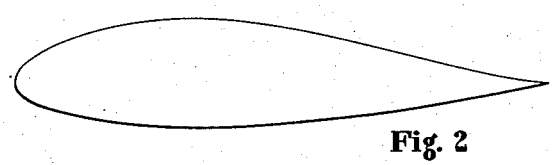
Figure 1:
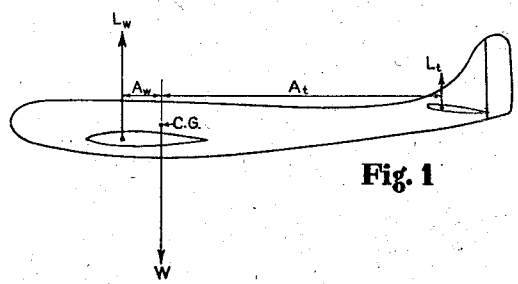

Figure 1 is a diagrammatic illustration of an airplane, indicating a representative arrangement of lift and weight forces acting upon it. Figure 2 is a profile of a typical main sustaining wing section, while Figure 3 shows in profile a representative prior art horizontal stabilizer and elevator combination.

Figure 6:
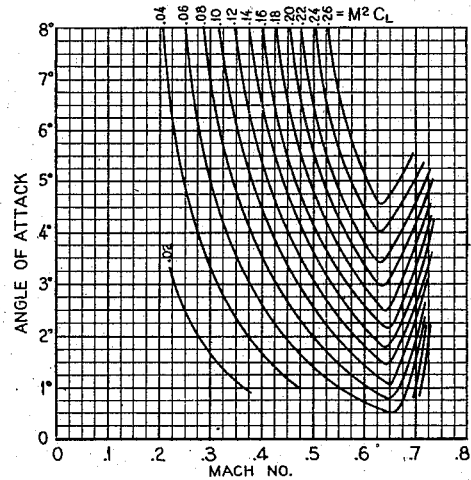
Figure 3:
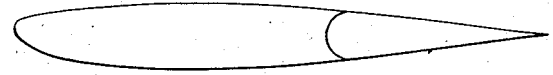
Figure 4:
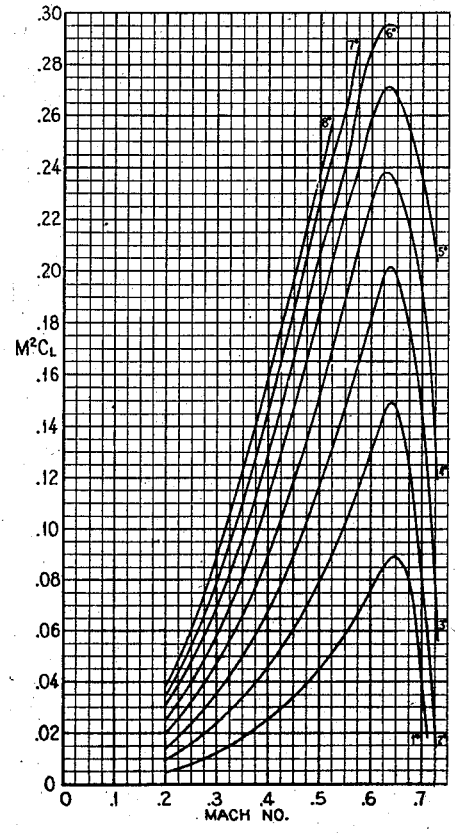

Figure 4 is a graph showing lift characteristics of a wing having a profile such as shown in Figure 2 for various speeds and angles of attack, and Figure 5 is a similar graph illustrating lift characteristics of a prior art horizontal tail surface having a profile such as shown in Figure 3. Figure 6 is a graph portraying lift characteristics of a wing having a profile such as shown in Figure 2, indicating the variation in angle of attack required at different velocities to maintain selected values of lift.

In selecting the type of wing and tail surface to be used for particular airplanes the lift characteristics of various airfoil shapes have been ascertained. Ordinarily this has been done in a wind tunnel by selecting a convenient miniature airfoil and relative air speed. The lift coefficient $C_L$ has then been ascertained for various angles of attack at the particular air speed selected, and curves have been plotted illustrating the increase in $C_L$ for increasing angles of attack. For any given angle of attack the lift available with an airfoil of a given profile has been considered to vary in proportion to the square of the velocity.

Although lift at various selected speeds may be calculated on this basis, such assumption is approximately correct only for comparatively low speeds. At speeds approaching that of sound the lift for each angle of attack, instead of continuing to increase substantially in proportion to the square of the velocity, actually decreases precipitately. The velocity at which such lift reversal occurs varies slightly for a given airfoil at different angles of attack. For a given angle of attack such velocity will vary greatly for airfoils of different profile, and particularly of different thickness ratio. The air temperature also influences the velocity at which the lift reversal occurs in the same manner that the velocity of sound is affected by temperature changes.

It is known that the velocity of sound varies considerably with the temperature of the air. At temperatures obtaining at sea level its speed may exceed 763 miles per hour, corresponding to 59° F., while at temperatures encountered at high altitudes, for example above 30,000 feet, this speed may be reduced below 663 miles per hour, corresponding to −67° F. Satisfactory flight conditions for conventional airplanes cannot be guaranteed merely by limiting their air speed to the range below that of sound, however, because the local velocity of air deflected by and flowing over at least some portions of a wing appreciably exceeds the free stream velocity or air speed. Considerably before the airplane's speed equals that of sound, therefore, the velocity of the accelerated flow over some parts of the wing will exceed that speed, resulting in a drastic reduction in lift. This critical condition will occur at different air speeds for airplanes having wings of different profile.

The lift curves in the graph of Figure 4 indicate the magnitude and character of the decrease in lift for a wing of conventional profile and thickness ratio, such as shown in Figure 2, as the free stream velocity increases. Since $$L = A\frac{\rho}{2}V^2 C_L$$

where L represents lift, A represents wing area, $\rho$ is the air density, V is the free stream velocity, and $C_L$ is a lift coefficient characteristic of the particular airfoil, $$\frac{L}{V^2 C_L} = A\frac{\rho}{2}$$

Because $\rho$ is substantially constant for a given altitude and $A$ is constant for a given airplane, $L$ is proportional to $V^2 C_L$. Instead of plotting lift against velocity, therefore, the curves may be adapted to airplanes having different wing areas by plotting $V^2 C_L$ against $V$. As stated previously, however, a given lift will be produced at different velocities depending upon the temperature of the air, just as the speed of sound varies with air temperature. Thus in order to eliminate the temperature effect from the curves velocity may be expressed as a constant fraction $$\frac{V}{a}$$

of the velocity of sound $a$, which fraction is known as Mach's Number or $M$. The curve ordinates may therefore represent $M^2 C_L$, proportional to lift, and the abscissae Mach's Number, proportional to free stream velocity. Since the lift reversal vertex for a given angle of attack occurs at different velocities only in accordance with different air temperatures, it occurs at a single value of Mach's Number. As indicated, each curve corresponds to a different angle of attack. Thus for a selected wing area and air of any given temperature and density, lift could replace $M^2 C_L$ as ordinates, and the air speed could replace Mach's Number as the abscissae without changing the shapes of the curves.

The airfoil profile shown in Figure 2 is relatively thick, having a thickness ratio of 20%. Such a profile is desirable for internally braced monoplane wings to allow adequate room for trusswork, especially for airplanes with high wing loading. Access through the wing to outboard engines may also be afforded, and such a profile is aerodynamically efficient. In flowing around such a wing, however, the air must be accelerated above the free stream velocity to move smoothly over the airfoil and avoid low pressure conditions behind it. It is my belief that the lift curves shown in Figure 4 reverse at the free stream velocity corresponding to the acceleration of air flowing locally over some portion of such a wing to a value in the vicinity of the velocity of sound, and that such reversal is caused by the compressibility characteristics of the air at such velocity.

Figure 5 illustrates similar curves for an airfoil profile such as illustrated in Figure 3, having a thickness ratio of 12%. Such an airfoil is commonly used for horizontal tail surfaces, including the horizontal stabilizer and elevator, which conventionally have a plan form area only a small fraction of the main wing area, the proportions corresponding generally, of course, to the reciprocal of the ratio of the lengths of the respective lever arms $A_w$ and $A_t$ in Figure 1, in the instance illustrated being about 1/7. It will be observed that no curvature reversal occurs at Mach's Numbers below .7, represented in this graph, indicating that for a given free stream air speed the local acceleration of the air flowing about the thinner airfoil is less than that flowing about the thicker airfoil. This might be expected because the air has a shorter distance to travel from the leading edge to the trailing edge.

As indicated in Figure 1, the concentrated weight resultant $W$ of the airplane may be considered as acting downward at the center of gravity C. G. The resultant lift force $L_w$ of the main wing commonly acts at a location forward of the center of gravity. This resultant produces a stalling moment about the center of gravity computed as the product of such resultant and the lever arm $A_w$ through which it acts. In order to maintain level flight, therefore, a horizontal tail surface, producing a relatively small lift resultant $L_t$ acting at a much greater distance rearward of the center of gravity, creates an equal balancing diving moment about the center of gravity, calculated as the product of the tail lift resultant $L_t$ and its lever arm $A_t$.

Since for steady horizontal flight conditions the vertical forces and moments must balance about the center of gravity the following equations must be satisfied:

$$L_w + L_t = W$$
$$L_w \times A_w = L_t \times A_t$$

In these equations the effect of drag moments about the center of gravity and the variation in length of the lever arms caused by shift in the center of gravity, or in the location and direction of the wing and tail lift resultants have been neglected, since the influence of such changes on the action and effect of my invention is negligible.

As mentioned previously, it has been customary to employ comparatively thick wing sections, such as shown in Figure 2, for the main wing or lifting surface of an airplane, and a much thinner airfoil section, such as that shown in Figure 3, for the horizontal tail surface. The area, plan form, and other design characteristics of the main wing and tail surface are selected and these elements are located with respect to the center of gravity of the airplane to establish longitudinal stability by balancing the moments about the center of gravity for substantially level flight conditions as described above. As the speed of the aircraft increases within the lower speed range the lift on the main supporting wing tends to increase substantially in proportion to the square of the velocity, so the angle of wing attack must be decreased to preserve $L_w$ substantially equal to the total weight $W$ of the airplane. Thus for substantially level flight conditions there is a definite angle of attack corresponding to each velocity, and this is equally true for diving conditions even though the weight and lift vectors are not substantially parallel.

The range of change in the wing's angle of attack as the velocity varies may be ascertained conveniently by reference to Figure 6, each curve corresponding to a constant lift for a given wing area at a constant air density. If the $M^2 C_L$ curve which corresponds to the total weight and altitude of a selected airplane is chosen, it will be seen that the angle of attack for the required lift decreases as the speed increases until the Mach's Number exceeds .60, at which point a vertex occurs in the curve. Within the low speed range below this value, therefore, the angle of attack of the wing must decrease with increasing speed, or increase with decreasing speed. In a stable airplane, to increase the relative air speed the pilot swings the elevator downward to increase the angle of attack of the tail surface for producing a diving moment, and to decrease the relative air speed the pilot swings the elevator upward to decrease the angle of attack of the horizontal tail surface for producing a stalling moment. In effect, therefore, the elevator serves as the speed control, and this is true at all speeds. In a stable airplane the elevator is not returned to neutral after effecting a speed changing movement, but the conventional airplane lacks stability of speed control by elevator movement at speeds above the Mach's Number corresponding to the lift curve reversal, for the pilot must continually reverse his controls in a hunting manner to fly in such high speed range, for the reasons hereafter explained.

Below the point of wing lift reversal, in both the conventional airplane and in my airplane, the speed may be increased a definite amount by depressing the elevator through a given angle and maintaining such angle. This movement increases the tail lift to create a diving moment, which in turn decreases the wing's angle of attack until the new condition of equilibrium is reached corresponding to such greater speed, down elevator angle and lesser wing angle of attack. Conversely, the speed of the airplane may be decreased a definite amount by swinging the elevator upward through a predetermined angle and holding it in that position. This movement decreases the tail lift to produce a stalling moment which increases the wing's angle of attack until once more a condition of equilibrium occurs automatically in which the lesser speed of the airplane corresponds to the upward elevator setting and the greater wing angle of attack.

In thus varying the speed below the critical Mach's Number it is to be noted that a diving moment is required both to increase the speed of the airplane and to maintain such increased speed by establishing a decreased wing angle of attack. Conversely, a stalling moment is required both to decrease the speed and to maintain the increased wing angle of attack corresponding to such decreased speed, the lift being constant as the speed of the airplane is increased or decreased.

Within the high speed range above the point of wing lift curve reversal, which occurs at Mach's Number of about .65, an increase in speed may be produced by swinging the elevator downward to create a diving moment for depressing the flight path, as in the low speed range. At the increased speed thus resulting, however, the wing's angle of attack must be increased to preserve the lift constant, as indicated by Fig. 6, so that after attainment of such increased speed a stalling moment to produce such greater wing angle of attack must follow the diving moment effecting the speed increase. With a conventional airplane in which the tail load acts upwardly such increase in speed induces an increased tail lift, as shown in Figure 5, automatically increasing the diving moment for a given angle of attack, and consequently the elevator must be swung upward even beyond its initial position after the new speed is attained to produce the requisite stalling moment for establishing the greater wing angle of attack required to create the lift necessary to stabilize the airplane at such speed.

Such upward swinging of the elevator to maintain this increased speed constant therefore involves a reversal of control by the pilot from that employed to induce the increase in speed. If the elevator is swung upward even a little too far for establishing the greater wing angle of attack corresponding to such increased speed the excessive stalling moment thus created will slow the airplane down by elevating the flight path. To return the airplane to the increased speed previously established, therefore, it is necessary again to swing the elevator downward for producing a diving moment, and when the desired speed has been restored the elevator control must be reversed once more in an effort to effect precisely the proper wing angle of attack. If the stalling moment created by the reversely swung elevator is this time not quite great enough the residual diving moment will induce a further increase in speed by depression of the flight path. The elevator must now be swung excessively far upward to produce a stalling moment not only adequate to establish the proper wing angle of attack but also to slow down the airplane to the desired speed. As a result a continual hunting action of the control occurs because of the extreme difficulty of effecting exactly the correct degree of alternately reversing elevator movement.

The converse operation is required to decrease the speed of the airplane within the high speed range. When the elevator is swung upward to produce a stalling moment for elevating the flight path to decrease the speed, a lesser wing angle of attack is required to maintain a constant lift at such lower speed, as shown by reference to Figure 6. For producing the requisite diving moment to reduce the wing's angle of attack to the required degree the elevator must be swung downward beyond the position which it assumed before it was displaced upward to decrease the speed of the airplane. Because of the difficulty of effecting exactly the correct downward swinging of the elevator to stabilize the airplane lift at the new slower speed without slowing the airplane too much and without subsequently effecting a speed increasing downward movement of the elevator, again a serious control reversal hunting action will occur.

In addition to the undesirable hunting operation of the elevator control, effected in an effort to maintain an increased or a decreased speed above the crtical wing lift curve reversal Mach's Number, the controllability of the airplane is progressively decreased. As stated above, to stabilize the conventional airplane at an increased speed above the critical Mach's Number the elevator must be overcontrolled in an upward direction in order to retain each speed increase increment. As the speed is increased, therefore, the elevator must be held farther and farther upward. To reduce the speed, however, the elevator must be swung still farther upward in order to create the excess stalling moment necessary to elevate the flight path of the airplane to slow it down. As the elevator is swung farther upward to increase the airplane's speed the effort required will increase, not only because of the increased deflection of the elevator but also because of the greater air load resulting from the increased speed, until a speed is reached where the pilot is unable, because of his strength limitation, to swing the elevator upward farther. Assuming that the airplane is stabilized at such speed, if the pilot's effort is relaxed in the slightest a speed increasing diving moment will be produced. The pilot now cannot swing the elevator upward far enough even to stabilize the airplane at such increased speed, and the diving moment will continue to depress the flight path and the speed will increase progressively faster. Thus if the stalling moment following production of a speed increasing diving moment is not sufficiently great to stabilize the airplane at the new speed, or if such stalling moment is not produced sufficiently promptly, it may be impossible to stabilize the airplane at all, and, out of control, its speed will continue to increase and its flight path to be depressed by the diving moment until the airplane crashes.

The difficulty with prior practice, as pointed out, has been that while a reversal of the constant lift curve for the main supporting airfoil, having a profile as shown in Figure 2 for example, occurred between Mach's Numbers of .6 and .65, the lift on the tail surface, having a profile similar to that of Figure 3, was not similarly affected adversely by an increase in speed. On the contrary each increase in speed above such critical Mach's Number produced a tail diving moment for a given angle of attack, although to stabilize the airplane at such increased speeds it was necessary to create stalling moments for increasing the wing angle of attack sufficiently to preserve the lift constant. After swinging the elevator downward to increase the speed in the high speed range, therefore, it was necessary to reverse the elevator and to swing it upward not only toward its initial position, but beyond such position sufficiently both to counteract the lift increasing effect of the increased speed and actually to decrease the tail lift for producing the stalling moment necessary to maintain constant wing lift at the increased speed.

By my invention I am able to preserve the stability characteristics of the airplane, making it unnecessary to reverse the swinging of the elevator after it has been moved either to increase or to decrease speed in the high speed range above the Mach's Number corresponding to the wing lift curve vertex. Thus as the airplane speed increases, the elevator will continue to be swung downward despite the necessity for producing an increasing stalling moment to effect an increasing wing angle of attack, and, conversely, as the speed of the airplane decreases, the elevator will continue to be swung upwardly, conforming in each case to the direction of elevator movement corresponding to increase and decrease of airplane speed below the lift curve reversal Mach's Number.

The expedient which I employ to obtain an increasing stalling moment despite an increasing downward elevator movement above the critical Mach's Number is to select a horizontal tail surface, including stabilizer and elevator, having lift characteristics such that the lift forces on its decrease at least as rapidly as the wing lift decreases with increasing speed above a Mach's Number of .65, and such tail lift forces may decrease faster. Thus the composite horizontal tail surface may have a profile similar to that of the wing, as shown in Figure 2, so that it will have lift curves similar to those of Figure 4.

In my airplane the movement of the elevator and its action for increasing and decreasing the speed below the critical Mach's Number will be the same as that described for the conventional airplane within the low speed range. Within the high speed range, however, after the elevator has been swung downward to produce a speed increasing diving moment, it is not necessary to reverse the control for swinging the elevator upward to preserve the wing lift constant. Instead the stalling moment required for this purpose is created automatically since the increased speed decreases the tail lift sufficiently, instead of increasing it. As the wing's angle of attack must be increased to preserve a constant lift with increasing speed in the high speed range, similarly at least as great an increase in tail angle of attack is required to prevent the occurrence of a speed decreasing stalling moment, and preferably slight progressively further downward swinging of the elevator is necessary for producing the stabilizing stalling moment mandatory to maintain the proper wing angle of attack. Thus as the speed increases within the high speed range the elevator must be swung downward farther and farther, just as in the low speed range.

Because continued downward movement of the elevator, even within the high speed range, is required, the movement of the elevator available for control purposes is not diminished. On the contrary, if the pilot merely relaxes his effort upon or releases the elevator control the aerodynamic forces acting on the elevator will swing it upward instantly to create a stalling moment to elevate the flight path for decreasing the speed of the airplane. In the conventional airplane, however, as discussed above, the elevator must be held farther and farther upward as the speed increases in the high speed range, so that if it is released it will be swung downward by the aerodynamic forces to create a diving moment, so such airplane is unstable.

As the airplane's speed decreases in the high speed range it will be evident from the curves of Figures 4 and 6 that its wing will now produce the same lift at a lesser angle of attack. Consequently a tail diving moment following the speed decreasing stalling moment is required to stabilize the airplane at such a decreased speed. Again it is not necessary to reverse the controls by swinging the elevator downward to produce such tail diving moment, however, for the decrease in speed similarly causes the tail surfaces to produce an increased lift. In fact such increase in tail lift may be, and preferably is, greater than necessary to produce the diving moment required to decrease the wing's angle of attack sufficiently to maintain constant lift. In such event, therefore, it will be necessary to maintain the elevator in a relatively upwardly swung position in order to prevent too great an increase in diving moment. As the airplane's speed is thus decreased progressively within the high speed range, therefore, the elevator will be swung upward progressively, just as it is swung in both the conventional airplane and mine as the speed is decreased within the low speed range.

It will thus be evident that by the use of my invention the elevator is swung and the controls are manipulated in precisely the same manner to effect as to preserve a given increase or decrease in speed, whether the airplane is operating within the speed range below the wing lift curve reversal or above this point. The essence of my invention is the use of a horizontal tail surface whose lift increases as speed increases within the speed range in which the wing lift increases with increase in speed, and whose lift decreases with increasing speed in the range where the wing lift decreases as the speed increases.

Preferably these speed ranges of the wing and horizontal tail surfaces coincide, although in some instances it may be desirable for the high speed range of the tail, in which its lift decreases with increasing speed, to commence at a Mach's Number slightly lower than that at which the high speed range of the wing begins. The lift reversal vertex of the tail surface lift curve should never occur at a Mach's Number appreciably higher than that at which the wing lift curve vertex occurs, however, as it does in the case of the conventional airplane determined by a comparison of Figures 4 and 5. The only effect of the tail lift curve vertex occurring at a Mach's Number somewhat lower than that of the wing lift curve vertex is that at such intermediate Mach's Numbers it will be necessary to swing the elevator downward at a rate relative to increasing speed somewhat greater than would otherwise be the case, and, conversely to swing the elevator upward at a rate corresponding to decreasing speed somewhat greater than would otherwise be necessary.

The reason for such variation in elevator deflection rate is that while at increasing speeds below the critical wing lift Mach's Number the lift of the tail would normally be increasing to assist in producing the diving moment necessary to decrease the wing angle of attack for maintaining a constant wing lift, the tail lift in this case decreases instead as the speed increases above its own critical Mach's Number. To product the necessary degree of diving moment, therefore, a greater tail angle of attack is required, effected by swinging the elevator farther downward. When the airplane speed is decreasing within the range between the critical Mach's Numbers of the wing and tail, however, the tail lift increases with decrease in speed for a given angle of attack instead of decreasing, and consequently a greater decrease in tail angle of attack by excessive upward swinging of the elevator is required to produce sufficient stalling moment to maintain the wing lift constant.

It will be seen, however, that such variation in elevator deflection does not require a reversal of the pilot's controls, but merely a somewhat greater movement of them in the usual direction, which is not objectionable. An airplane having a horizontal tail surface, including stabilizer and elevator, of a somewhat greater thickness ratio than that of the wing would have these characteristics, to locate the lift reversal vertex of the tail surface lift curves for various angles of attack at a lower Mach's Number than the lift reversal vertex of the wing lift curves.

It will be evident that my invention is intended for airplanes having a high terminal velocity, namely, at least in excess of 400 miles per hour, and becomes of great importance only in airplanes having a terminal velocity exceeding 500 miles per hour.

What I claim as my invention is:

1. In an airplane having a fixed main supporting wing, and capable of attaining speeds greater than that corresponding to a critical Mach's Number above which the lift of the wing decreases at a given angle of attack with increasing speed, a horizontal airfoil spaced longitudinally from the wing and so formed as to produce a decreasing aerodynamic reaction, at a given angle of attack, proportionately at least as great as the decreasing lift of the wing upon increase in speed of the airplane in the range above the speed corresponding to such critical Mach's Number.

2. In an airplane having a fixed main supporting wing, and capable of attaining speeds greater than that corresponding to a critical Mach's Number above which the lift of the wing decreases at a given angle of attack with increasing speed, a horizontal tail airfoil spaced rearwardly from the wing and so formed as to produce a decreasing lift, at a given angle of attack, corresponding to the decreasing lift of the wing upon increase in speed of the airplane in the range above the speed corresponding to such critical Mach's Number.

3. In an airplane having a fixed main supporting wing, and capable of attaining speeds greater than that corresponding to a critical Mach's Number above which the wing is capable of producing a substantially constant lift only at increasing angles of attack as the airplane speed increases, a horizontal airfoil spaced longtudinally from the wing, having a plan form area equal to a minor portion of the plan form area of such wing, and formed and arranged to produce a substantially constant aerodynamic reaction as the speed of the airplane increases, within the range above the speed corresponding to such critical Mach's Number, only by an increase in angle of attack.

4. In an airplane having a fixed main supporting wing, and capable of attaining speeds greater than that corresponding to a critical Mach's Number above which the wing is capable of producing a substantially constant lift only at increasing angles of attack as the airplane speed increases, a horizontal tail airfoil spaced rearwardly from the wing, having a plan form area equal to a minor portion of the plan form area of such wing, and formed and arranged to produce a substantially constant lift force as the speed of the airplane increases, within the range above the speed corresponding to such critical Mach's Number, only by an increase in angle of attack at least as great as the corresponding increase in angle of attack of the wing required to produce a substantially constant wing lift.

5. In an airplane having a fixed main supporting wing, and capable of attaining speeds greater than that corresponding to a critical Mach's Number above which the wing is capable of producing a substantially constant lift only at increasing angles of attack as the airplane speed increases, a horizontal tail airfoil spaced rearwardly from the wing, having a plan form area equal to a minor portion of the plan form area of such wing, and formed and arranged to produce a substantially constant lift force for all increases in speed of the airplane, within the range above the speed corresponding to such critical Mach's Number, only by an increase in angle of attack.

6. In an airplane, a fixed main supporting wing having convex upper and lower surfaces, such airplane being capable of attaining speeds greater than that corresponding to a critical Mach's Number above which said wing is capable of producing a substantially constant lift only at increasing angles of attack as the airplane speed increases, and a horizontal airfoil spaced longitudinally from said wing having convex upper and lower surfaces, having a planform area equal to a minor portion of the planform area of said wing, and having a ratio of average thickness to average chord at least as great as such ratio of said main supporting wing.

7. In an airplane, a fixed main supporting wing having convex upper and lower surfaces, such airplane being capable of attaining speeds greater than that corresponding to a critical Mach's Number above which said wing is capable of producing a substantially constant lift only at increasing angles of attack as the airplane speed increases, and a horizontal airfoil spaced longitudinally from said wing having convex upper and lower surfaces, having a planform area equal to a minor portion of the planform area of said wing, and having a ratio of average thickness to average chord substantially equal to such ratio of said main supporting wing.

8. In an airplane, a fixed main supporting wing having convex upper and lower surfaces, such airplane being capable of attaining speeds greater than that corresponding to a critical Mach's Number above which said wing is capable of producing a substantially constant lift only at increasing angles of attack as the airplane speed increases, and a composite horizontal tail surface rearwardly of said wing including a forward horizontal stabilizer and a rearward elevator, the profile shape and ratio of average thickness to average chord of said composite tail surface being substantially the same as the profile shape and ratio of average thickness to average chord of said wing, the lift forces produced by said wing and said horizontal tail surface at a given angle of attack of the airplane thereby decreasing substantially proportionately as the airplane speed increases within the range above the speed corresponding to such critical Mach's Number.

9. In an airplane, a fixed main supporting wing having a ratio of average thickness to average chord of approximately 20%, such airplane being capable of attaining speeds greater than that corresponding to a critical Mach's Number above which said wing is capable of producing a substantially constant lift only at increasing angles of attack as the airplane speed increases, and a horizontal airfoil structure rearward of said main supporting wing having an average thickness to average chord ratio of at least 20%.

10. In an airplane, a fixed main supporting wing having convex upper and lower surfaces, and having a ratio of average thickness to average chord of the order of 20%, such airplane being capable of attaining speeds greater than that corresponding to a critical Mach's Number above which said wing is capable of producing a substantially constant lift only at increasing angles of attack as the airplane speed increases, and a composite horizontal tail surface rearward of said wing, including a forward horizontal stabilizer and a rearward elevator pivoted upon the rear portion of said horizontal stabilizer, the ratio of the average thickness of said stabilizer to the average composite chord of said horizontal stabilizer and elevator also being of the order of 20%, thereby, within the range above the speed corresponding to such critical Mach's Number, to require an increase in angle of attack of said stabilizer with increasing speed to produce a constant lift force substantially equal to the increase in angle of attack of said main supporting wing required for it to produce a constant lift force for the same increase in speed.

GEORGE S. SCHAIRER.